United States Patent [19]

Kronenberg et al.

[11] 4,377,751
[45] Mar. 22, 1983

[54] OPTICAL WAVEGUIDE DOSIMETER

[75] Inventors: Stanley Kronenberg, Skillman, N.J.; Harry Levine, Silver Spring, Md.; William L. McLaughlin, Washington, D.C.; Carl R. Siebentritt, McLean, Va.

[73] Assignee: The United States of America as represented by the Secretary of the Army, Washington, D.C.

[21] Appl. No.: 267,312

[22] Filed: May 28, 1981

[51] Int. Cl.³ .............................................. G01N 5/00
[52] U.S. Cl. ............................... 250/474.1; 250/472.1
[58] Field of Search ........................... 250/472.1, 474.1

[56] References Cited

U.S. PATENT DOCUMENTS 3,608,999 9/1971 Bailey ........................... 250/474.1 X
3,691,380 9/1972 Hubner et al. ..................... 250/474.1
4,130,760 12/1978 Fanselow et al. ................ 250/474.1

OTHER PUBLICATIONS

Kronenberg et al., "Fiber Optics Dosimetry", Paper presented at 6th International Conference of Solid State Dosimetry, Toulouse, France, Apr. 1-4, 1980.

Primary Examiner—Davis L. Willis
Attorney, Agent, or Firm—Nathan Edelberg; Jeremiah G. Murray; Roy E. Gordon

[57] ABSTRACT

An optical waveguide dosimeter for personnel dosimetry is provided including a liquid solution of leuko dye hermetically sealed in plastic tubing. Optical transport is improved by dipping the ends of the plastic tubing into clear epoxy, thus forming beads that serve as optical lenses. A layer of clear ultraviolet absorbing varnish coated on these beads and an opaque outer layer over the plastic tubing provides protection against ambient UV.

22 Claims, 1 Drawing Figure

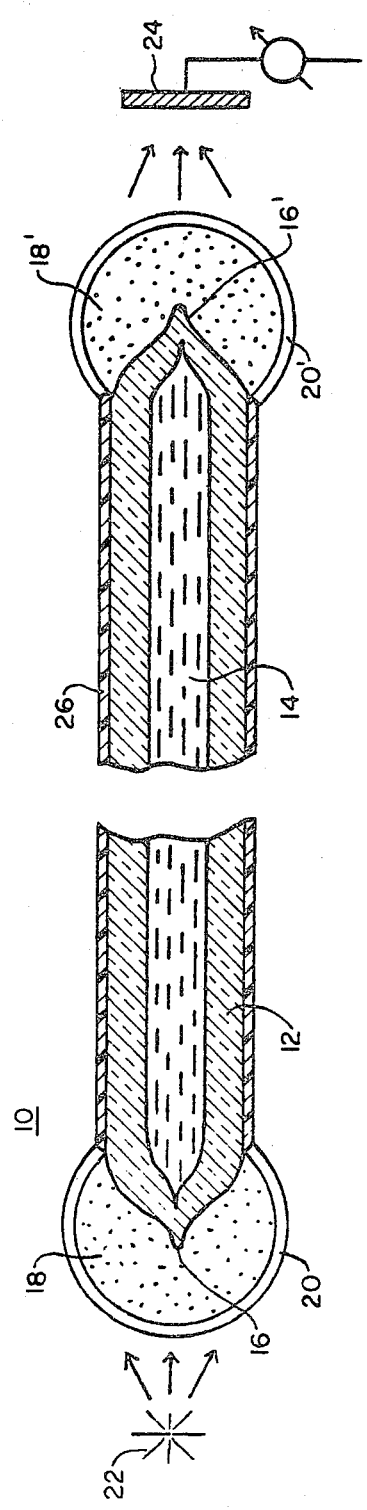

OPTICAL WAVEGUIDE DOSIMETER

The invention described herein may be manufactured, used, and licensed by or for the Government for governmental purposes without the payment to us of any royalty thereon.

This invention relates in general to ionizing radiation dosimetry and in particular to an optical waveguide dosimeter.

BACKGROUND OF THE INVENTION

Radiation induced darkening of leuko dyes has been used as the basis of various dosimeters for measurements of high nuclear radiation doses in the range of $10^3$ to $10^7$ rads. This is because leuko dyes are colorless dyes which change color when exposed to ionizing radiation. Though the use of leuko dyes has been good for scientific dosimetry, the leuko dyes have not been used for personnel dosimetry where the range of interest is 0 to 1000 rads.

SUMMARY OF THE INVENTION

The general object of this invention is to provide a low-cost, portable dosimeter for personnel dosimetry that does not require maintenance and that can be used in civil defense emergencies. A further object of the invention is to provide such a dosimeter that does not require any power source or auxiliary equipment such as a readout device or charger. A still further object of the invention is to provide such a dosimeter that can be stored for long periods and be available instantly for use in case of an emergency. Another object of the invention is to increase the sensitivity of leuko dye dosimetry by several orders of magnitude to make it applicable for emergency personnel dosimetry where doses of 0 to 1000 rads (tissue) are of interest.

It has now been found that the foregoing objects can be attained by incorporating a liquid solution of a leuko dye as the core of an optical wave guide. More particularly, according to the invention, the optical wave guide dosimeter includes the liquid solution of leuko dye hermetically sealed in flexible and transparent plastic tubing. To improve optical transport, the ends of the plastic tubing are dipped into clear epoxy, forming beads that serve as optical lenses. A layer of clear ultraviolet absorbing varnish coated on these beads and an opaque outer layer over the plastic tubing provides protection against ambient UV.

DESCRIPTION OF THE DRAWING

A cut away cross sectional view of an optical wave guide dosimeter according to the invention is shown.

Referring to the drawing, the optical waveguide dosimeter, 10 includes flexible transparent plastic tubing, 12 filled with a solution of leuko dye 14. The ends of the tubing 12 are terminated by hermetic seals, 16 and 16'. The hermetic seals 16 and 16' are enclosed by clear epoxy forming beads, 18 and 18'. A layer of clear ultraviolet absorbing varnish 20 and 20' is coated on the forming beads 18 and 18' and an opaque outer coating 26 is provided over transparent plastic tubing, 12. This dosimeter is read by observing or measuring its attenuation to visible light from the light source, 22 and read by the eye or by the light detector, 24.

DESCRIPTION OF THE PREFERRED EMBODIMENT

An approximate 10 percent solution of hexahydroxyethyl pararosaniline cyanide in triethyl phosphate 14, is drawn into a capillary tube of "FEP", 12 a teflon-like flexible thermoplastic whose refractive index is 1.34. The refractive index of the triethyl phosphate is 1.41 thus satisfying the criterion of an optical waveguide which requires that the index of refraction of the core be greater than the index of refraction of the cladding (F.E.P.). The filled tube is then cut into sections of desired lengths with heated pliers. This procedure hermetically seals the ends but results in optically poor terminations. To improve optical transport by increasing the numerical aperture of the waveguide, the ends of the plastic tubing, 12 are dipped into clear epoxy, forming beads, 18, 18' that serve as optical lenses. A layer of clear ultraviolet absorbing varnish, 20, 20' coated on the beads 18, 18' and an opaque outer layer 26 over the tubing 12 provides protection against ambient UV. If compactness is desired, a thin plastic capillary may be coiled in a 3 cm diameter spool with protruding ends.

The absorbed dose of ionizing radiation: x-rays, gamma rays, beta rays or fast neutrons which was delivered to the dosimeter is found by measuring the ratio of intensities of visible light transmitted at two different wavelengths through the waveguide. This ratio is measured both before and after exposure to ionizing radiation. The ratio of these pre and post-exposure values is then calculated, and the dose is obtained by comparing this quantity to a previously prepared set of calibration curves or tables.

In the case of a self-contained hand-held dosimeter this procedure can be simplified. A light source such as a window, a light fixture, or a flashlight is viewed through the waveguide and its hue and color depth are compared with that of a calibrated color wedge. The dose inscribed on the edge of the color wedge is read at the point of the closest match. An alternate readout that requires a power source may be light emitted from a built in source as for example, a light emitting diode. After being attenuated by the waveguide, the transmitted light intensity is measured by means of a light detector and expressed in terms of the dose.

The dosimeter can be constructed so as to measure both the gamma dose and the fast neutron dose in units approximating tissue rads. This is achieved by utilizing the recoil protons generated in the hydrogen dye solution.

Leuko dyes that can be used in the dosimeter are those that produce a changing color when exposed to ionizing radiation. Preferred for use as the leuko dyes are the triphenyl methane radiochromic leuko dyes as for example, pararosaniline cyanide or hexahydroxyethyl pararosaniline cyanide. The change in color of the leuko dye is usually permanent. This permanency can be assured by the presence of dissolved oxygen and by adding about 1% of glacial acetic acid to the solution of dye.

The solvent for the leuko dye should be a polar organic solvent such as dimethyl sulfoxide, triethyl phosphate or N,N-dimethyl formamide. The latter two solvents are liquid between $-56.4C$ and $153C$; their indices of refraction are 1.48, 1.41 and 1.43 respectively. In this connection, the refractive index of the dye solution must be greater than the refractive index of the transparent tubing. Other solvents for the leuko dye that may be used include vinyl pyrollidone, tributyl phosphate and 2 methoxyethanol.

The plastic tubing, 12 which is filled with the solution of leuko dye should be flexible, transparent, and have a refractive index that is lower than the refractive index of the leuko dye solution that it contains to satisfy the condition for an optical waveguide. Suitable tubing for use in the invention include "FEP", and polytetrafluoroethylene.

In lieu of hermetically sealing both ends of the transparent tubing, one may provide a dependable seal by using a glass plug or a plug of any transparent material which does not interact with the radiochromic solution and that has a somewhat larger diameter than the diameter of the transparent tubing. In such an instance, the ultraviolet absorber varnish can be applied to the external end of the glass plug or windows made of UV absorbing plastic can be put on both ends of the transparent tubing. The UV absorber varnish will contain certain UV absorbing compounds as for example, aesculines, benzophenones, coumarones, coumarines, etc.

As the opaque outer coating, 26 one may use any black paint compatible with the flexible tubing or opaque outside tubing, e.g. a shrink tubing.

The diameter of the optical waveguide dosimeter is not critical. Those that can be used range from 0.5 to 4 millimeters.

The sensitivity of the dosimeter to nuclear/ionizing radiation depends on the length of the optical waveguide and on the concentration of the leuko dye solution. For example, for a resonably high concentration of about 15 percent of a concentrated solution of hexahydroxyethyl pararosaniline cyanide in triethyl phosphate, the required length of the waveguide to cover the range 0 to 1000 rads is about 15 centimeters.

The quantum energy response of the dosimeter is determined mainly by the composition of the solvent and of the cladding. If the dosimeter is kept in a container made of tissue-equivalent material during exposure to gamma radiation under conditions approximating electron equilibrium, the response will approach that of tissue over a broad range of photon energies. A suitable combination of solvents such as triethyl phosphate, dimethyl sulfoxide, and N,N-dimethyl formamide can provide an essentially muscle equivalent or bone-equivalent medium in terms of radiation absorption properties for photon energies of 0.01 to 20 MeV.

We wish it to be understood that we do not desire to be limited to the exact details as described for obvious modifications will occur to a person skilled in the art.

What is claimed is:

1. An optical waveguide dosimeter, said dosimeter comprising flexible transparent tubing filled with a solution of leuko dye, the refractive index of the dye solution being greater than the refractive index of the transparent tubing, a protective flexible and opaque outside tubing over the transparent tubing, the ends of the transparent tubing being hermetically sealed, the ends of the transparent tubing further being provided with optical lenses to improve the numerical aperture, the optical lenses further being provided with a coating of a layer of clear ultraviolet absorbing varnish to provide protection against ambient UV.

2. An optical waveguide according to claim 1 wherein the leuko dye is a triphenylmethane radiochromic dye.

3. An optical waveguide according to claim 2 wherein the triphenylmethane radiochromic leuko dye is para rosaniline cyanide.

4. An optical waveguide according to claim 2 wherein the triphenylmethane radiochromic leuko dye is hexahydroxyethyl para rosaniline cyanide.

5. An optical waveguide according to claim 1 wherein the solvent of the solution of leuko dye is selected from the group consisting of triethyl phosphate, vinyl pyrollidone, tributyl phosphate, dimethylsulfoxide, and N,N-dimethyl formamide.

6. An optical waveguide according to claim 5 wherein the solvent is triethyl phosphate.

7. An optical waveguide according to claim 5 wherein the solvent is vinyl pyrollidone.

8. An optical waveguide according to claim 5 wherein the solvent is tributyl phosphate.

9. An optical waveguide according to claim 5 wherein the solvent is dimethylsulfoxide.

10. An optical waveguide according to claim 5 wherein the solvent is N,N-dimethyl formamide.

11. An optical waveguide according to claim 1 wherein the solution is of hexahydroxyethyl para rosaniline cyanide dissolved in triethyl phosphate.

12. An optical waveguide according to claim 1 wherein the solution is of hexahydroxyethyl para rosaniline cyanide dissolved in dimethylsulfoxide.

13. An optical waveguide according to claim 1 wherein the solution is of hexahydroxyethyl para rosaniline cyanide dissolved in N,N-dimethyl formamide.

14. An optical waveguide according to claim 1 wherein the transparent tubing is polytetrafluoroethylene tubing.

15. An optical waveguide according to claim 1 wherein the protective opaque outside tubing is black shrink tubing.

16. An optical waveguide according to claim 1 wherein the optical lenses are forming beads, the forming beads being obtained by dipping the ends of the waveguide into clear epoxy.

17. An optical waveguide according to claim 1 wherein the liquid solution of leuko dye includes about 1 percent of glacial acetic acid.

18. A device for sensing ionizing radiation comprising: radiation transparent tubing filled with a transparent radiochromic liquid, said liquid having a transparency which changes with the intensity of ionizing radiation, the refractive index of the liquid being greater than the refractive index of the transparent tubing, an outer tubing opaque to ultraviolet light over the transparent tubing, the ends of the transparent tubing being enclosed and sealed to retain said liquid, and a clear ultraviolet absorbing coating over the enclosed ends to provide a shield against ambient ultraviolet light.

19. The device of claim 18 wherein said radiochromic liquid includes a leuko dye.

20. The device of claim 18 wherein said transparent tubing is of a flexible thermoplastic.

21. The device of claim 18 wherein said ends include optical lenses to increase the numerical aperture.

22. The device of claim 18 including a source of light at one end, and means for detecting the change in light intensity transmitted through said waveguide.

* * * * *